United States Patent
Kimura et al.

(10) Patent No.: US 9,822,740 B2
(45) Date of Patent: Nov. 21, 2017

(54) AIR INTAKE DUCT AND METHOD FOR PRODUCING SAME

(75) Inventors: Masahiro Kimura, Tokyo (JP); Kuniharu Tobe, Tokyo (JP); Katsunobu Nishida, Kiryu (JP)

(73) Assignees: HINO MOTORS, LTD., Tokyo (JP); EXCELL CORPORATION, Matsudo-shi (JP)

( * ) Notice: Subject to any disclaimer, the term of this patent is extended or adjusted under 35 U.S.C. 154(b) by 1049 days.

(21) Appl. No.: 13/516,015

(22) PCT Filed: Dec. 22, 2010

(86) PCT No.: PCT/JP2010/007433
§ 371 (c)(1),
(2), (4) Date: Jun. 14, 2012

(87) PCT Pub. No.: WO2011/077719
PCT Pub. Date: Jun. 30, 2011

(65) Prior Publication Data
US 2012/0252343 A1    Oct. 4, 2012

(30) Foreign Application Priority Data
Dec. 25, 2009   (JP) .................. 2009-294468

(51) Int. Cl.
*B29C 49/20* (2006.01)
*F02M 35/10* (2006.01)
(Continued)

(52) U.S. Cl.
CPC ....... *F02M 35/10013* (2013.01); *B29C 49/20* (2013.01); *F02M 35/10262* (2013.01);
(Continued)

(58) Field of Classification Search
CPC .......... Y02T 10/146; B29C 2049/2078; B29C 49/04; B29C 49/20; B29C 2049/2013;
(Continued)

(56) References Cited

U.S. PATENT DOCUMENTS 4,378,945 A * 4/1983 Trautman ............... B60K 13/02
                                                                 180/309
5,135,702 A * 8/1992 Eales ...................... B29C 49/20
                                                                 264/515
(Continued)

FOREIGN PATENT DOCUMENTS

EP    0 433 923 A1   6/1991
JP       56 28831   3/1981
(Continued)

OTHER PUBLICATIONS

International Search Report dated Apr. 5, 2011 in PCT/JP10/007433 filed on Dec. 22, 2010.
(Continued)

*Primary Examiner* — Gregory Huson
*Assistant Examiner* — Dana Tighe
(74) *Attorney, Agent, or Firm* — Oblon, McClelland, Maier & Neustadt, L.L.P.

(57) ABSTRACT

An air intake duct 8 is fixed to a rear of a cab 3 of a transport vehicle to extend vertically, air intakes 6a, 6b, 6c, 6d, 6e and 6f being opened on an upper portion of the air intake duct for suction of fresh air through the intakes as engine intake air. The air intake duct 8 is constituted by a blow-molded duct body 9 and an internal partition component 10 enclosed in the duct body in blow molding of the duct body 9 to partition an interior of the duct body 9 into a plurality of channels A, B, C, D, E and F reaching the air intakes.

12 Claims, 6 Drawing Sheets

(51) Int. Cl.
  *F02M 35/16* (2006.01)
  *B29C 49/04* (2006.01)
  *B29L 23/00* (2006.01)
  *B29L 31/30* (2006.01)

(52) U.S. Cl.
  CPC .... *F02M 35/10347* (2013.01); *F02M 35/164* (2013.01); *B29C 49/04* (2013.01); *B29C 2049/2013* (2013.01); *B29C 2049/2078* (2013.01); *B29L 2023/22* (2013.01); *B29L 2031/30* (2013.01); *Y02T 10/146* (2013.01)

(58) Field of Classification Search
  CPC .... B29C 2048/2013; B29C 2048/2078; F02M 35/10262; F02M 35/164; F02M 35/10013; F02M 35/10347; B29L 2023/22; B29L 2031/30
  USPC ......... 454/143, 94, 118, 146, 147, 151, 165; 264/513; 425/525
  See application file for complete search history.

(56) References Cited

U.S. PATENT DOCUMENTS

| | | | | |
|---|---|---|---|---|
| 5,266,262 A | * | 11/1993 | Narayama et al. | 264/513 |
| 5,762,858 A | | 6/1998 | Maeda et al. | |
| 5,776,411 A | * | 7/1998 | Miyazawa et al. | 264/511 |
| 6,804,360 B1 | * | 10/2004 | Misawa et al. | 381/71.5 |
| 2008/0026094 A1 | * | 1/2008 | Dettinger et al. | 425/542 |
| 2009/0255501 A1 | * | 10/2009 | Honzawa | F02M 35/10013 123/184.53 |

FOREIGN PATENT DOCUMENTS

| | | | |
|---|---|---|---|
| JP | 61-83020 A | 4/1986 | |
| JP | 2 125716 | 5/1990 | |
| JP | 9 144615 | 6/1997 | |
| JP | 2000 120497 | 4/2000 | |
| JP | 2000-168373 A | 6/2000 | |
| JP | 2000 168374 | 6/2000 | |
| JP | 2000 320414 | 11/2000 | |
| JP | 2002 317720 | 10/2002 | |
| JP | 2002317720 A * | 10/2002 | ............. F02M 35/16 |
| JP | 2002 322952 | 11/2002 | |

OTHER PUBLICATIONS

Communication pursuant to Rules 70(2) and 70a(2) EPC dated May 11, 2015 in Patent Application No. 10838957.8.

Extended European Search Report dated Apr. 20, 2015 in Patent Application No. 10838957.8.

* cited by examiner

AIR INTAKE DUCT AND METHOD FOR PRODUCING SAME

TECHNICAL FIELD

The present invention relates to an air intake duct and a method for producing the same.

BACKGROUND ART

Generally, it is preferable, for a truck or other large-sized transport vehicle traveling on unpaved rough roads more often than an ordinary passenger car, that an engine sucks in not air near the ground containing plenty of dust but clean air at a sufficient height above the ground. To eliminate a concern of sucking in splashing rainwater or snow together near the ground, it is preferable to ensure that the engine sucks in the air only at the sufficient height above the ground.

Figure 1:
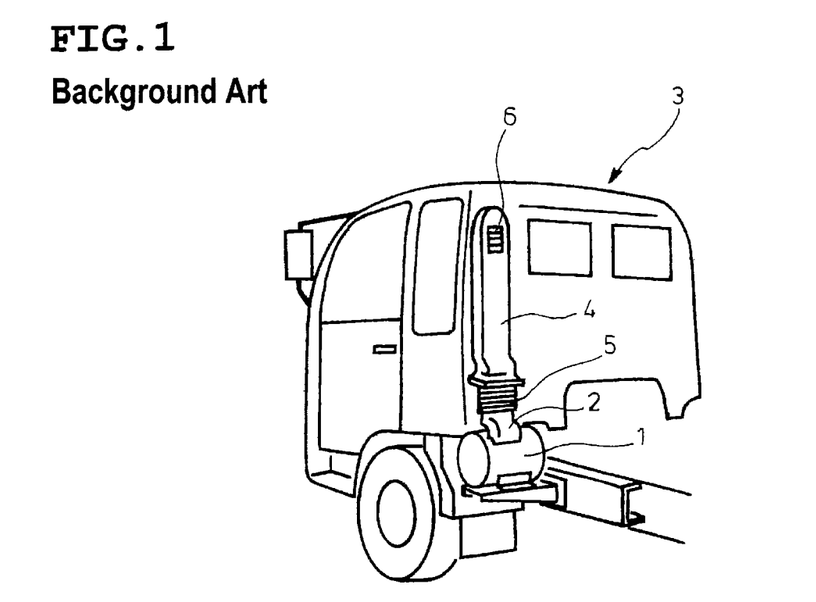
FIG. 1 is a schematic view showing an ordinary air intake duct.

Therefore, as exemplarily shown in FIG. 1, a large-sized transport vehicle has an air cleaner 1 with a vertical air-cleaner inlet duct 2 connected thereto. An air intake duct 4 fixed to a rear of a cab 3 is connected via a flexible boot 5 to the inlet duct 2 so that fresh air may be sucked in through an air intake 6 opened on an upper portion of the duct 4.

The inventors examined a flow velocity (flow rate) of fresh air sucked in through such air intake duct 4 to find out that no matter how large an opening area of the air intake 6 is, fresh air is sucked in one-sidely through a lower portion of the intake 6 and hardly through an upper portion of the intake 6. It is feared that the one-sided suction of fresh air through the lower portion of the air intake 6 may increase the flow velocity, leading to promoted suction of rain, snow and/or dust through the lower portion of the intake 6.

Figure 2:
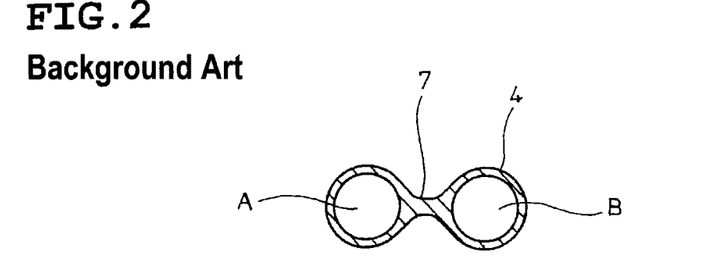
FIG. 2 is a sectional view showing a conventional structure of crushing a portion of an air intake duct to form partitioned channels.

Thus, in order to uniform a flow velocity distribution of fresh air sucked in through the air intake 6, it has been considered to divide an interior of the air intake duct 4 into a plurality of channels to form a multi-cell structure. Conventionally, the division of the interior of the air intake duct 4 into the plural channels is made such that a portion of the air intake duct 4 is pinched by and crushed between dies (not shown) to form a partition wall 7 in a blow molding process which provides divided channels A and B, as shown in section in FIG. 2.

A state-of-art technology relating to ordinary air intake ducts is disclosed, for example, in Patent Literature 1 mentioned below.

CITATION LIST

Patent Literature

[Patent Literature 1] JP 2002-317720A

SUMMARY OF INVENTION

Technical Problems

However, in the conventional method of pinching and crushing a portion of the air intake duct 4 by and between the dies to form the partition wall 7 in the blow molding process, crushing the portion of the air intake duct 4 results in a smaller channel sectional area, thus inviting a problem of increased air intake resistance.

The invention was made in view of the above and has its object to provide an air intake duct with an interior divided into a plurality of channels to form a multi-cell structure without inviting increased air intake resistance.

Solution to Problems

The invention is directed to an air intake duct fixed to a rear of a cab of a transport vehicle to extend vertically, air intakes being opened on an upper portion of the air intake duct for suction of fresh air therethrough as engine intake air, characterized in that it comprises a blow-molded duct body and an internal partition component enclosed in the duct body in blow molding of the duct body to partition an interior of the duct body into a plurality of channels reaching said air intakes.

Thus, according to this, the interior of the duct body can be partitioned into the channels only by enclosing the separately fabricated internal partition component in the duct body in blow molding of the duct body, which makes it possible to keep a channel sectional area larger than that in the conventional method of pinching and crushing a portion of the air intake duct by and between dies to form a partition wall, thereby avoiding increased air intake resistance.

Further, the air intake duct of the invention may be produced by: fixing an internal partition component in an erected position, using a fixing support, under a molding machine head; downwardly injecting a cylindrical shaped molten resin from the molding machine head to envelope the internal partition component; pinching the molten resin enveloping the internal partition component by dies from opposite sides; blowing compressed air through the fixing support into the molten resin pinched by the dies to swell and press the molten resin against inner walls of the dies; and after cooling and solidification of the molten resin, opening the dies to extract a duct body having the internal partition component enclosed therein as a molded product.

Advantageous Effects of Invention

In the above-mentioned air intake duct and method for producing the same according to the invention, the interior of the duct body can be partitioned into the channels while a channel sectional area in the duct body is kept large, which offers a superior effect of dividing the interior of the duct body into the channels to form the multi-cell structure without inviting increased air intake resistance.

DESCRIPTION OF EMBODIMENT

An embodiment of the invention will be described with reference to drawings.

FIGS. 3 to 6 show an embodiment of the invention in which the components identical with those in FIG. 1 are represented by the same reference numerals.

Figure 3:
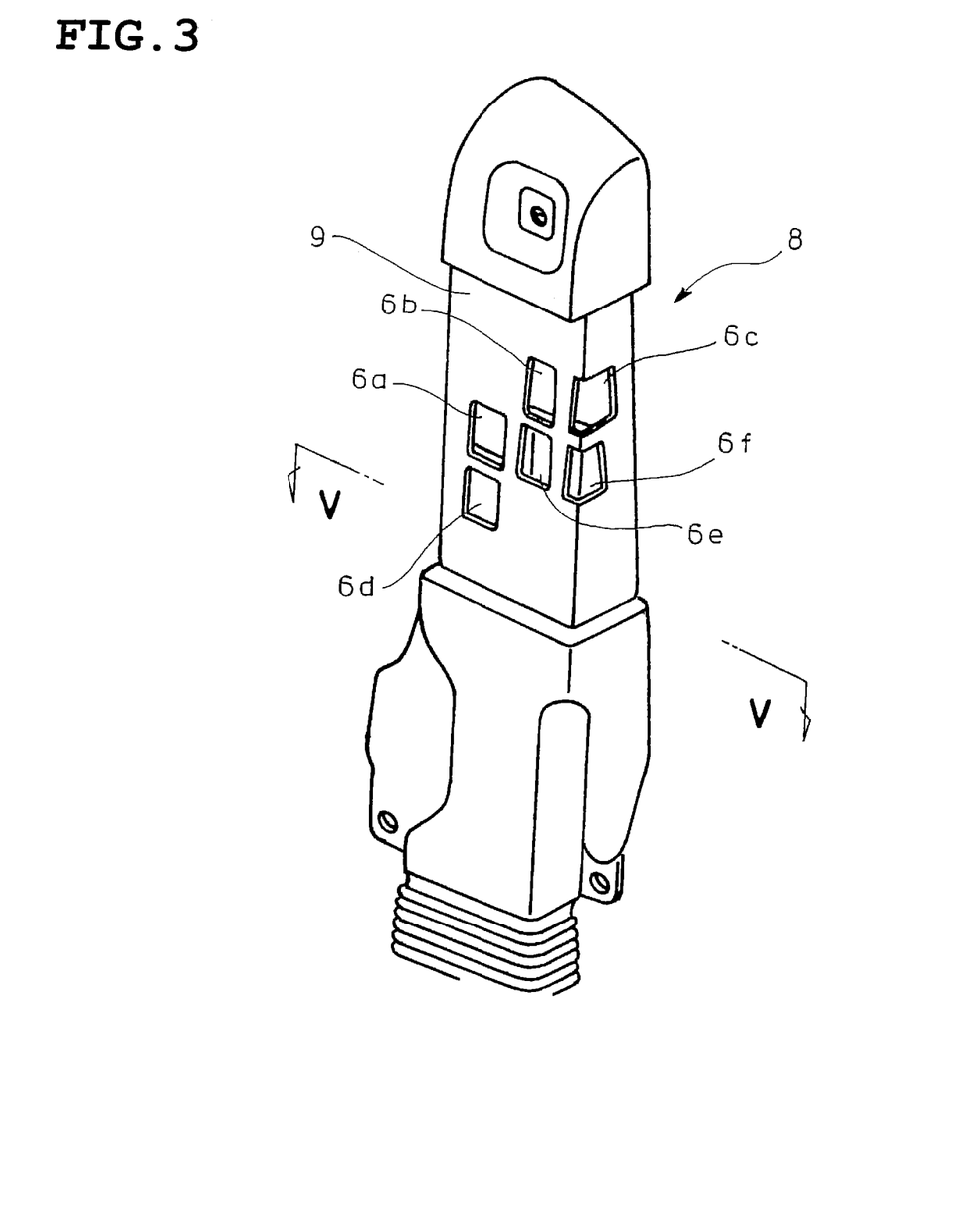
FIG. 3 is a perspective view showing an embodiment of the invention.
Figure 4:
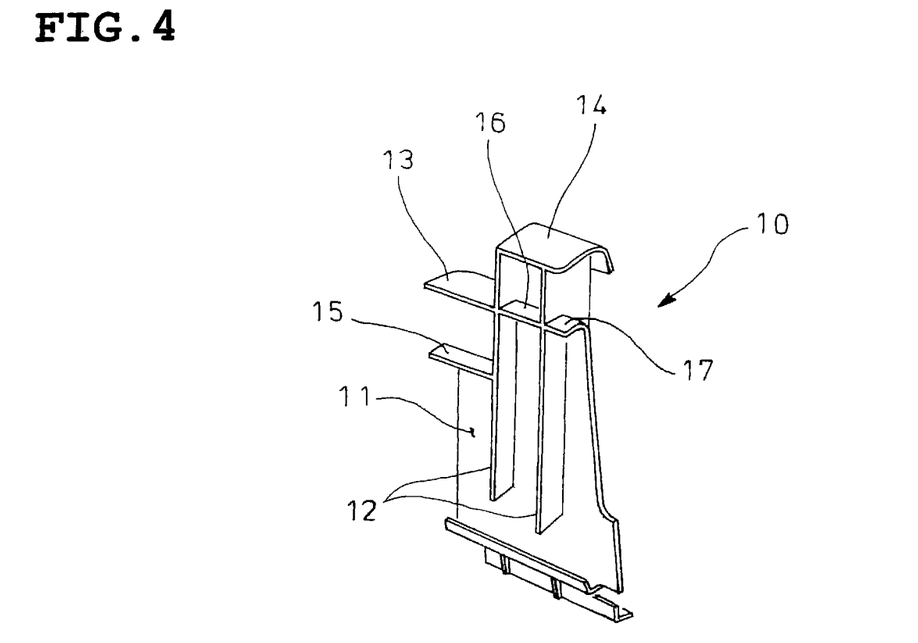
FIG. 4 is a perspective view showing an internal partition component enclosed in a duct body in FIG. 3.
Figure 5:
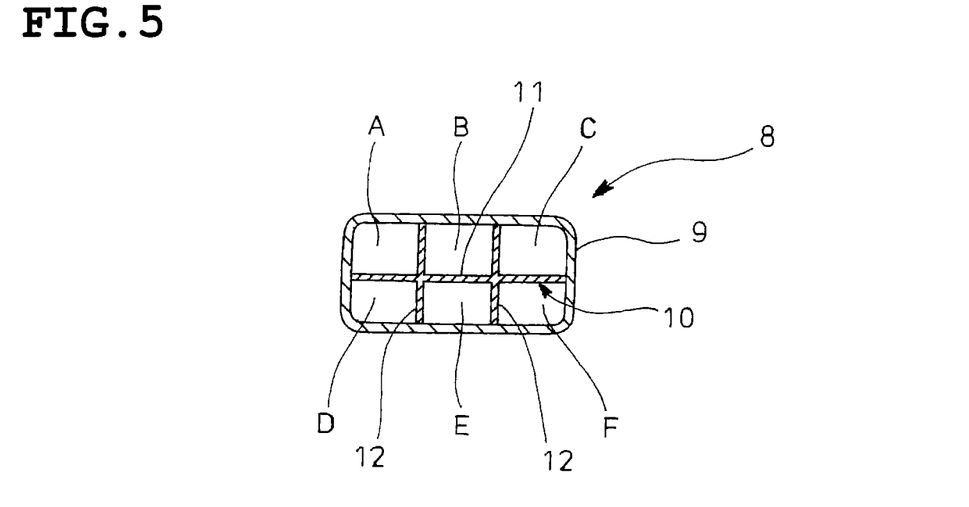
FIG. 5 is a sectional view of FIG. 3 taken in the direction of arrows V.

As shown in FIGS. 3 and 4, an air intake duct 8 in the embodiment comprises a blow-molded duct body 9 (see FIG. 3) having air intakes 6a, 6b, 6c, 6d, 6e and 6f formed as openings on an upper portion of the duct body 9, and an internal partition component 10 (see FIG. 4) which is enclosed in the duct body 9 upon blow molding of the duct body 9 to partition an interior of the duct body into a plurality of channels A, B, C, D, E and F (see FIG. 5) reaching the air intakes 6a, 6b, 6c, 6d, 6e and 6f, respectively.

Specifically, the internal partition component 10 is a separately produced as an injection molded component having a longitudinal partition wall 11 longitudinally partitioning the interior of the duct body 9 and side partition walls 12 further partitioning the interior of the duct body 9, which has been longitudinally partitioned by the longitudinal partition wall 11, laterally. The internal partition component 10 is enclosed in the duct body 9 upon blow molding of the duct body 9 so that the internal partition component 10 is able to partition the interior of the duct body 9 into the six channels A, B, C, D, E and F (see FIG. 5).

Figure 6:
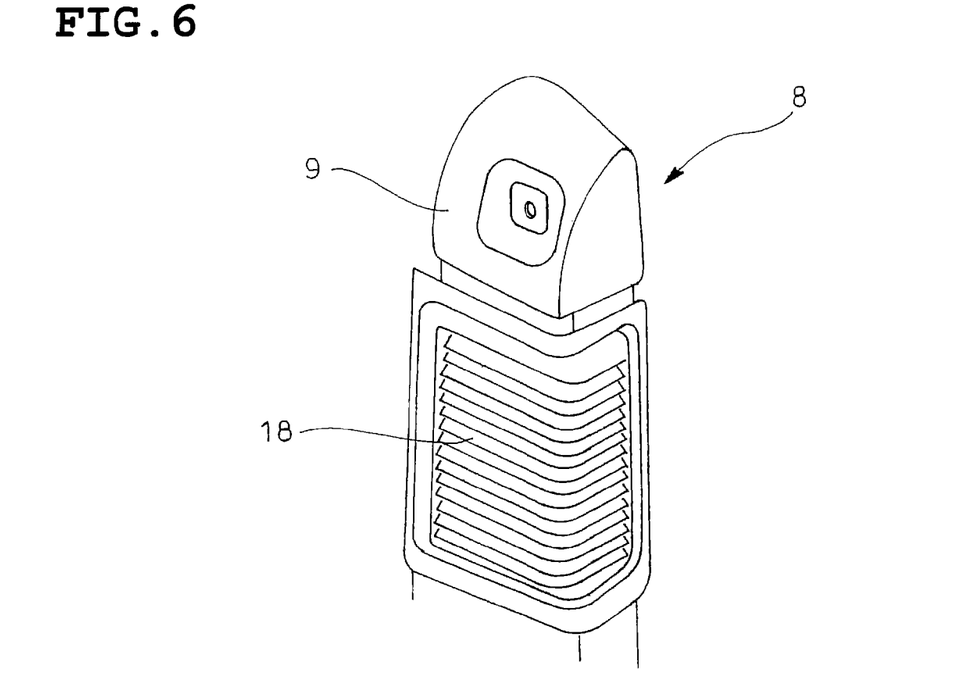
FIG. 6 is a perspective view showing a front face of an air intake in FIG. 3 covered with a louver.

The internal partition component 10 is also provided with guides 13, 14, 15, 16 and 17 which are formed to cause the channels A, B, C, D, E and F to communicate with the air intakes 6a, 6b, 6c, 6d, 6e and 6f, respectively. In the embodiment illustrated, the channels A, B and C which are rear ones partitioned by the longitudinal partition wall 11 communicate with the upper-side air intakes 6a, 6b and 6c while the channels D, E and F which are front ones partitioned by the longitudinal partition wall 11 communicate with the lower-side air intakes 6d, 6e and 6f. As shown in FIG. 6, it is preferable that the air intakes 6a, 6b, 6c, 6d, 6e and 6f (see FIG. 3) are covered with a louver 18 so that suction of, for example, rain or snow can be avoided as much as possible.

Figure 7:
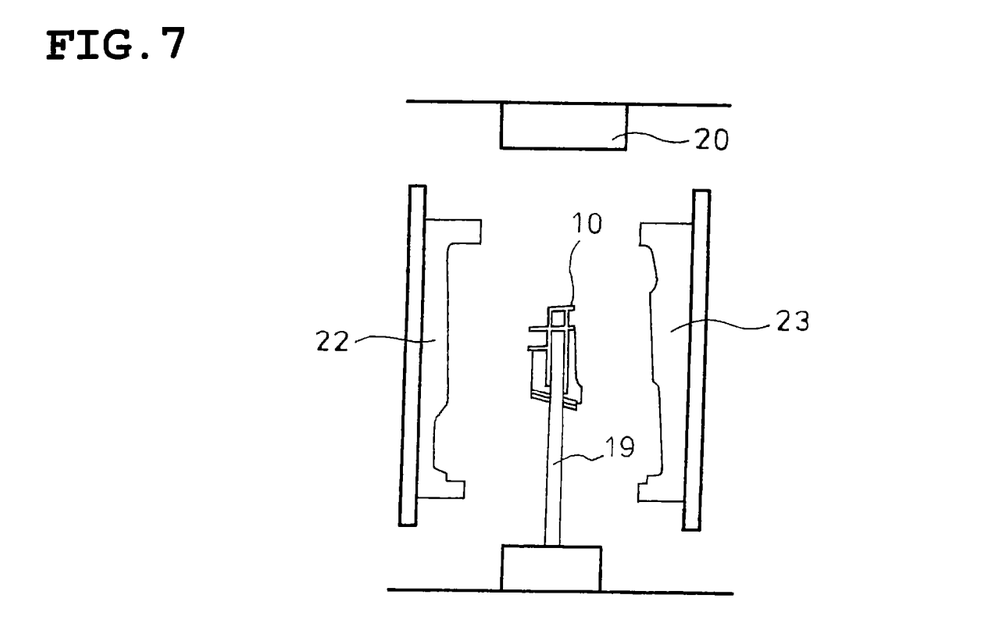
FIG. 7 is a schematic view showing the internal partition component fixed to a fixing support.
Figure 8:
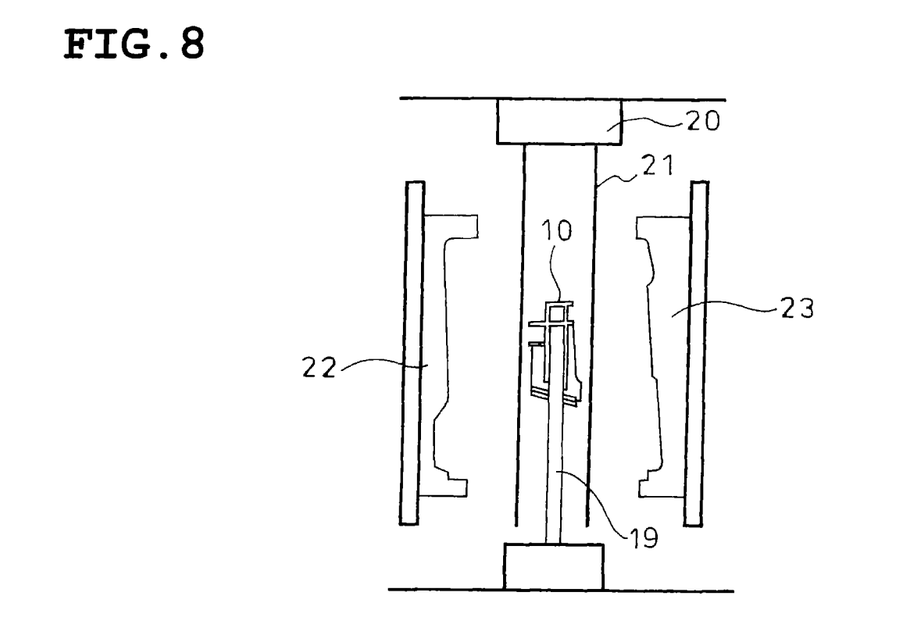
FIG. 8 is a schematic view showing the internal partition component enveloped in a cylindrically shaped molten resin.
Figure 9:
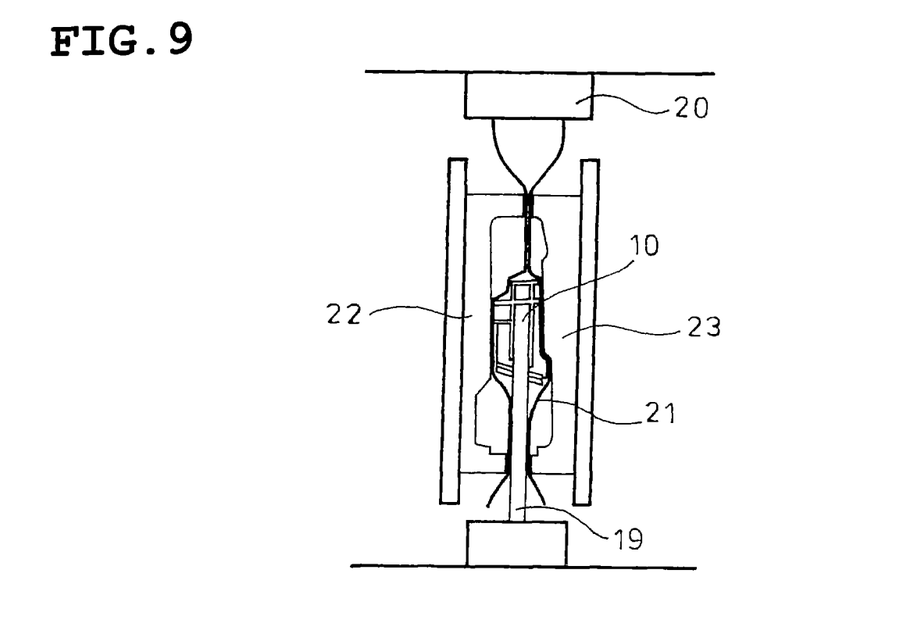
FIG. 9 is a schematic view showing the molten resin pinched by dies from opposite sides.
Figure 10:
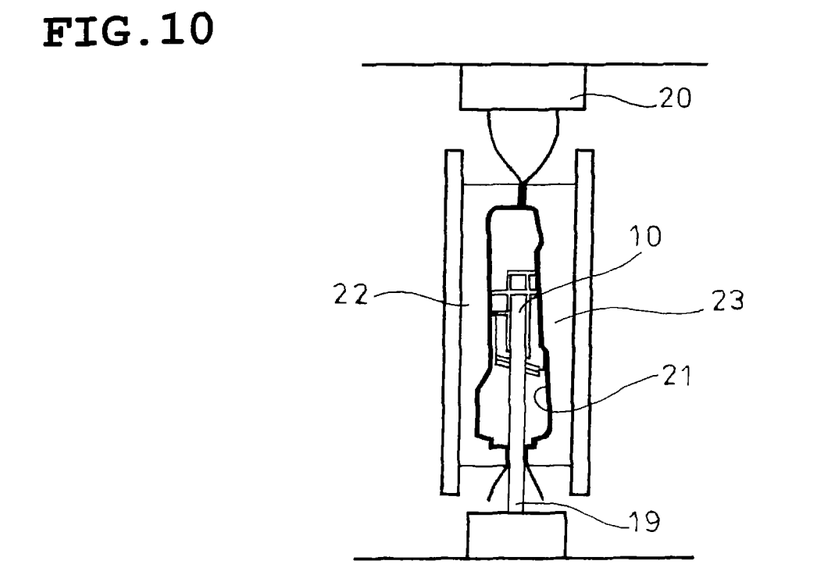
FIG. 10 is a schematic view showing the molten resin swelled to be pressed against inner walls of the dies.
Figure 11:
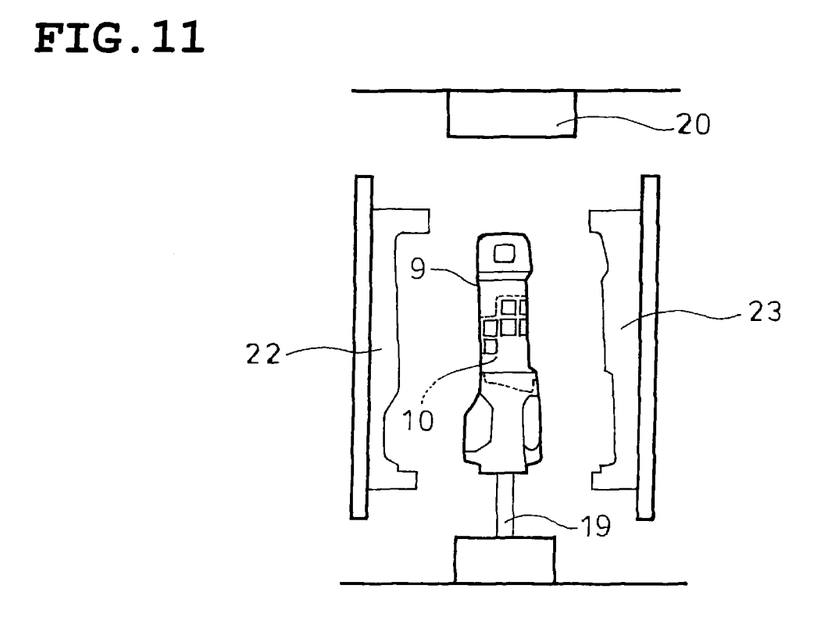
FIG. 11 is a schematic view showing the dies opened after the molten resin cools and solidifies.

The air intake duct 8 may be produced in the following manner. As shown in FIG. 7, under a molding machine head 20, the internal partition component 10 is erectly supported by a fixing support 19 for fixing from below. Then, as shown in FIG. 8, a cylindrical-shaped molten resin 21 (parison) is injected downward from the molding machine head 20 to envelope the internal partition component 10. As shown in FIG. 9, the molten resin 21 enveloping the internal partition component 10 is then pinched by dies 22 and 23 from opposite sides. Then, as shown in FIG. 10, compressed air is sent through the fixing support 19 to swell and press the molten resin 21 against inner walls of the dies 22 and 23. As shown in FIG. 11, after cooling and solidification of the molten resin 21, the dies 22 and 23 are opened to extract the duct body 9 having the internal partition component 10 enclosed therein as a molded product.

FIGS. 7 to 11 are merely for schematic explanation of the production process by way of views on the internal partition component 10 and the duct body 9 taken in a direction for easily corresponding with the views of FIGS. 3 and 4 for facilitated explanation. It should be noted that an actual direction of molding by the dies 22 and 23 does not necessarily match the direction of molding shown in FIGS. 7 to 11.

The above explanation referring to FIGS. 7 to 11 describes a case where the internal partition component 10 is supported and fixed with the fixing support 19 under the internal partition component 10. Alternatively, the dies 22 and 23 may be turned upside down, the internal partition component 10 being also inverted and fixed in a suspended position from above with the fixing support 19.

Alternatively, the internal partition component 10 may be fixed from above and below using two fixing supports 19, which enables more stable fixing of the component 10. Although openings are formed on both lower and upper portions of the product body in this fixing method, such a fixing method may be adopted depending on the design of the air intake duct 8.

Thus, with the air intake duct 8 configured in the manner above, the interior of the duct body 9 can be partitioned into the plural channels A, B, C, D, E and F merely by enclosing the separately fabricated internal partition component 10 in the duct body 9 in blow molding of the duct body 9, which can keep a channel sectional area larger than the conventional method of pinching and crushing a portion of an air intake duct by and between dies to form a partition wall, thus enables avoiding increased air intake resistance.

Thus, according to the embodiment, the interior of the duct body 9 can be partitioned into the plural channels A, B, C, D, E and F while the channel sectional area in the duct body 9 is kept large. Hence the interior of the duct body 9 can be divided into the plural channels A, B, C, D, E and F to form a multi-cell structure without inviting increased air intake resistance.

It is to be understood that an air intake duct and a method for producing the same according to the invention are not limited to the above embodiment and that various changes and modifications may be made without departing from the scope of the invention.

REFERENCE SIGNS LIST 3 cab
6a, 6b, 6c, 6d, 6e and 6f air intake
8 suction duct
9 duct body
10 inner partition component
19 fixing support
20 molding machine head
21 molten resin
22 and 23 mold
A, B, C, D, E and F channel

The invention claimed is:

1. An air intake duct, comprising:
    a blow-molded duct body; and
    an internal partition component formed before a blow molding of the duct body and enclosed in the duct body in the blow molding of the duct body to partition an interior of the duct body into a plurality of channels reaching air intakes, wherein
    the air intake duct is fixed to a rear of a cab of a transport vehicle to extend vertically, and the air intakes are opened on an upper portion of the air intake duct for suction of fresh air therethrough as engine intake air, and the air intakes are disposed in stacked pairs, an upper air intake of each stacked pair flows the fresh air into a respective one of the plurality of channels that is disposed on a first side of a longitudinal partition wall, and a lower air intake of each stacked pair flows the fresh air into a respective one of the plurality of channels that is disposed on a second side of the longitudinal partition wall, and the longitudinal partition wall extends vertically inside the duct body.

2. The air intake duct as claimed in claim 1, wherein the internal partition component includes the longitudinal partition wall partitioning the interior of the duct body longitudinally, and side partition walls partitioning the interior of the duct body laterally.

3. The air intake duct as claimed in claim 1, wherein the duct body includes the air intakes distributed on more than one surface of the duct body.

4. The air intake duct as claimed in claim 1, wherein the internal partition component includes guides to distribute channels that are formed by dividing the interior of the duct body longitudinally and laterally, and the guides communicate with the air intakes.

5. The air intake duct as claimed in claim 1, wherein the air intakes open in a horizontal direction into the plurality of channels, and the plurality of channels guide the fresh air vertically through the duct body.

6. A method for producing the air intake duct as claimed in claim 1, comprising:
fixing the internal partition component in an erected position, using a fixing support, under a molding machine head;
downwardly injecting a cylindrical shaped molten resin from the molding machine head to envelope the internal partition component;
pinching the molten resin enveloping the internal partition component by dies from opposite sides;
blowing compressed air through the fixing support into the molten resin pinched by the dies to swell and press the molten resin against inner walls of the dies; and
after cooling and solidification of the molten resin, opening the dies to extract the duct body having the internal partition component enclosed therein as a molded product.

7. An air intake duct that is fixable to a rear of a cab of a transport vehicle to extend vertically, and air intakes are opened on an upper portion of the air intake duct for suction of fresh air therethrough as engine intake air, the air intake duct comprising:
a blow-molded duct body; and
an internal partition component formed before a blow molding of the duct body and enclosed in the duct body in the blow molding of the duct body to partition an interior of the duct body into a plurality of channels reaching the air intakes, wherein
the air intakes are disposed in stacked pairs, an upper air intake of each stacked pair flows the fresh air into a respective one of the plurality of channels that is disposed on a first side of a longitudinal partition wall, and a lower air intake of each stacked pair flows the fresh air into a respective one of the plurality of channels that is disposed on a second side of the longitudinal partition wall, and the longitudinal partition wall extends vertically inside the duct body.

8. The air intake duct as claimed in claim 7, wherein the internal partition component includes the longitudinal partition wall partitioning the interior of the duct body longitudinally, and side partition walls partitioning the interior of the duct body laterally.

9. The air intake duct as claimed in claim 7, wherein the duct body includes the air intakes distributed on more than one surface of the duct body.

10. The air intake duct as claimed in claim 7, wherein the internal partition component includes guides to distribute channels that are formed by dividing the interior of the duct body longitudinally and laterally, and the guides communicate with the air intakes.

11. The air intake duct as claimed in claim 7, wherein the air intakes open in a horizontal direction into the plurality of channels, and the plurality of channels guide the fresh air vertically through the duct body.

12. A method for producing the air intake duct as claimed in claim 7, comprising:
fixing the internal partition component in an erected position, using a fixing support, under a molding machine head;
downwardly injecting a cylindrical shaped molten resin from the molding machine head to envelope the internal partition component;
pinching the molten resin enveloping the internal partition component by dies from opposite sides;
blowing compressed air through the fixing support into the molten resin pinched by the dies to swell and press the molten resin against inner walls of the dies; and
after cooling and solidification of the molten resin, opening the dies to extract the duct body having the internal partition component enclosed therein as a molded product.

* * * * *